(12) United States Patent
Sohum et al.

(10) Patent No.: US 12,033,186 B2
(45) Date of Patent: Jul. 9, 2024

(54) METHOD AND SYSTEM FOR ENABLING AN INTERACTION BETWEEN A USER AND A PODCAST

(71) Applicant: Affle International Pte. Ltd.

(72) Inventors: Anuj Khanna Sohum, Singapore (SG); Charles Yong Jien Foong, Singapore (SG); Madhusudana Ramakrishna, Singapore (SG)

(73) Assignee: Affle International Pte. Ltd., Singapore (SG)

( * ) Notice: Subject to any disclaimer, the term of this patent is extended or adjusted under 35 U.S.C. 154(b) by 263 days.

(21) Appl. No.: 17/073,279

(22) Filed: Oct. 16, 2020

(65) Prior Publication Data

US 2021/0117462 A1 Apr. 22, 2021

(30) Foreign Application Priority Data

Oct. 18, 2019 (SG) .............................. 10201909745S

(51) Int. Cl.
| | |
|---|---|
| *G06F 16/00* | (2019.01) |
| *G06F 16/435* | (2019.01) |
| *G06F 16/438* | (2019.01) |
| *G06F 16/48* | (2019.01) |
| *G06N 20/00* | (2019.01) |
| *G06Q 30/0251* | (2023.01) |
| *G10L 15/22* | (2006.01) |
| *G10L 15/26* | (2006.01) |

(52) U.S. Cl.
CPC ....... *G06Q 30/0257* (2013.01); *G06F 16/435* (2019.01); *G06F 16/438* (2019.01); *G06F 16/48* (2019.01); *G06N 20/00* (2019.01); *G06Q 30/0271* (2013.01); *G10L 15/22* (2013.01); *G10L 15/26* (2013.01); *G10L 2015/223* (2013.01)

(58) Field of Classification Search
CPC .... G06F 16/632; G06F 16/9535; G06F 16/26; G06F 16/24578; G06F 40/284; G06F 3/167; G06F 40/30
See application file for complete search history.

(56) References Cited

U.S. PATENT DOCUMENTS

2020/0065342 A1* 2/2020 Panuganty ............ G06F 16/632

* cited by examiner

*Primary Examiner* — Yicun Wu
(74) *Attorney, Agent, or Firm* — Kolisch Hartwell, P.C.

(57) ABSTRACT

The present disclosure provides a method and system for enabling interaction between a user and a podcast using a podcast interaction system. The podcast interaction system receives a first set of data a first set of data associated with the podcast. The podcast interaction system collects a second set of data associated with a communication device of the user. The podcast interaction system fetches a third set of data associated with the user accessing the podcast through the communication device in real-time. The podcast interaction system analyses the first set of data, the second set of data and the third set of data. The podcast interaction system detects the one or more triggers for enabling the interaction between the user and the podcast. The podcast interaction system initializes the interaction between the user and the podcast. The podcast interaction system interactively responds to one or more queries of the user.

16 Claims, 4 Drawing Sheets

METHOD AND SYSTEM FOR ENABLING AN INTERACTION BETWEEN A USER AND A PODCAST

TECHNICAL FIELD

The present disclosure relates to the field of podcast interaction and, in particular, relates to a method and system for method for enabling an interaction between a user and a podcast.

INTRODUCTION

Podcasts are becoming popular for content distribution over the internet. Podcasts are audio or video files which are made in episodic series. The podcasts are prepared for downloading and listening purpose by a user on a communication device. Generally, the user interacts with the podcast by raising questions using the communication device. In addition, the podcaster replies to the questions raised by the user. In the current scenario, there is no platform to detect trigger points during the podcast to initiate interaction between the user and the podcast. The interaction between the user and the podcast is initiated based on the detection of trigger points.

In light of the above stated discussion, there is a need for overcoming the above-mentioned disadvantages.

SUMMARY

In a first example, a computer-implemented method is provided. The computer-implemented method is used to enable an interaction between a user and a podcast. The computer implemented method includes a first step to receive a first set of data associated with the podcast at a podcast interaction system with a processor. In addition, the computer-implemented method includes a second step to collect a second set of data associated with a communication device of the user at the podcast interaction system with the processor. Further, the computer-implemented method includes a third step to fetch a third set of data associated with the user accessing the podcast through the communication device in real time. Furthermore, the computer-implemented method includes a fourth step to analyze the first set of data, the second set of data and the third set of data using one or more machine learning algorithms at the podcast interaction system with the processor. Moreover, the computer-implemented method includes a fifth step to detect one or more triggers for enabling the interaction between the user and the podcast in real-time at the podcast interaction system with the processor. Also, the computer-implemented method includes a sixth step to initialize the interaction between the user and the podcast in real-time at the podcast interaction system with the processor. Also, the computer-implemented method includes a seventh step to interactively respond to one or more queries of the user. The first set of data is received from a podcaster. The podcast is uploaded by the podcaster. The user accesses the podcast using the communication device in real-time. The analysis is performed based on training of a machine learning model. The analysis is performed for detecting one or more triggers. The analysis is performed in real time. The one or more triggers include at least one of system generated triggers, user generated triggers and podcaster generated triggers. The interaction between the user and the podcast is initiated based on the detection of the one or more triggers for raising the one or more queries. The response to the one or more queries is provided to the user in one or more output formats.

In an embodiment of the present disclosure, the first set of data includes audio data, video data, image data, subject matter of the podcast, theme of the podcast, keywords associated with the podcast, podcaster profile, and topics covered in the podcast. The podcast corresponds to any of an enhanced podcast, a podcast audiobook, a video podcast, and a live podcast.

In an embodiment of the present disclosure, the second set of data includes real-time location of the communication device, location history of the communication device, sound data from a microphone of the communication device, image data from a camera of the communication device, accelerometer data from an accelerometer of the communication device, gyroscope data from a gyroscope of the communication device, real-time movement data, and sensor data from a sensor of the communication device.

In an embodiment of the present disclosure, the third set of data is associated with a profile of the user. The third set of data includes name data, age data, e-mail identity data, contact number data, gender data, geographic location data, demographic data, relationship status data, past podcast search keywords data, real-time podcast search keywords data, past podcast reviews data, past podcast interactions data, user verbal commands, user text, user image data, communication device operated commands, past gestures data, and real-time gestures data.

In an embodiment of the present disclosure, the podcast interaction system recommends one or more podcasts to the user. The podcast interaction system provides recommendation of the one or more podcasts based on the third set of data. The third of data is utilized for determining interest of the user.

In an embodiment of the present disclosure, the podcast interaction system enables a multi-modal natural language analysis on the podcast and the user verbal commands using a natural language processing module for dynamic transcription of the podcast and the user verbal commands in a transcript data. The transcript data includes a speech-based transcription and a non-speech-based transcription.

In an embodiment of the present disclosure, the podcast interaction system identifies a plurality of characteristics associated to the podcast and the user based on the analysis performed based on the one or more machine learning algorithms and the natural language processing module. The plurality of characteristics include one or more keywords, topic transitions within the podcast, halts in the podcast, context of the podcast, an optimal time for the one or more triggers, an optimal position for the one or more triggers, a threshold time of the halt within the podcast, a threshold complexity, interests of the user, user journey throughout the podcast, and the one or more queries associated to the podcast.

In an embodiment of the present disclosure, the system generated triggers facilitate triggering of the interaction between the user and the podcast. The system generated triggers includes at least one of a significant keyword within the podcast, the halt within the podcast above the threshold time, the topic transitions within the podcast, referring to topics of the interests of the user within the podcast according to the profile of the user, and intricateness of content of the podcast above the threshold complexity.

In an embodiment of the present disclosure, the user generated triggers facilitate triggering of the interaction between the user and the podcast by the user. The user generated triggers includes at least one of the user verbal commands, the user text, user facial expressions, user gestures, and hardware button commands associated with the communication device.

In an embodiment of the present disclosure, the podcaster generated triggers facilitate triggering of the interaction between the user and the podcast by the podcaster. The podcaster is person that is host or producer of the podcast. The podcaster generated triggers includes at least one of a podcaster defined time in the podcast, a podcaster defined topic in the podcast, a podcaster defined topic transition in the podcast, and podcaster commands to a podcaster interaction trigger button.

In an embodiment of the present disclosure, the podcast interaction system connects the user with the podcaster for the interaction. The user is connected with the podcaster based on availability of the podcaster. The podcast interaction system automatically responds to a query of the one or more queries of the user with an optimal response from a database of responses. The database of responses is created based on a plurality of responses to the user from the podcast interaction system or the podcaster based on past queries.

In a second example, a computer system is provided. The computer system includes one or more processors, a signal generator circuitry embedded inside a computing device for generating a signal, and a memory. The memory is coupled to the one or more processors. The memory stores instructions. The instructions are executed by the one or more processors. The execution of the instructions causes the one or more processors to perform a method for enabling interaction between a user and a podcast. The method includes a first step to receive a first set of data associated with the podcast at the computer system. In addition, the method includes a second step to collect a second set of data associated with a communication device of the user at the computer system. Further, the method includes a third step to fetch a third set of data associated with the user accessing the podcast through the communication device in real time. Furthermore, the method includes a fourth step to analyze the first set of data, the second set of data and the third set of data using one or more machine learning algorithms at the computer system. Moreover, the method includes a fifth step to detect one or more triggers for enabling the interaction between the user and the podcast in real-time at the computer system. Also, the method includes a sixth step to initialize the interaction between the user and the podcast in real-time at the computer system. Also, the method includes a seventh step to interactively respond to one or more queries of the user. The first set of data is received from a podcaster. The podcast is uploaded by the podcaster. The user accesses the podcast using the communication device in real-time. The analysis is performed by a podcast interaction system based on training of a machine learning model. The analysis is performed for detecting one or more triggers. The analysis is performed in real time. The one or more triggers includes at least one of system generated triggers, user generated triggers and podcaster generated triggers. The interaction between the user and the podcast is initiated based on the detection of the one or more triggers for raising the one or more queries. The response to the one or more queries is provided to the user in one or more output formats.

In an embodiment of the present disclosure, the first set of data includes audio data, video data, image data, subject matter of the podcast, theme of the podcast, keywords associated with the podcast, podcaster profile, and topics covered in the podcast. The podcast corresponds to any of an enhanced podcast, a podcast audiobook, a video podcast, and a live podcast.

In an embodiment of the present disclosure, the second set of data includes real-time location of the communication device, location history of the communication device, sound data from a microphone of the communication device, image data from a camera of the communication device, accelerometer data from an accelerometer of the communication device, gyroscope data from a gyroscope of the communication device, real-time movement data, and sensor data from a sensor of the communication device.

In an embodiment of the present disclosure, the third set of data is associated with a profile of the user. The third set of data includes name data, age data, e-mail identity data, contact number data, gender data, geographic location data, demographic data, relationship status data, past podcast search keywords data, real-time podcast search keywords data, past podcast reviews data, past podcast interactions data, user verbal commands, user text, user image data, communication device operated commands, past gestures data, and real-time gestures data.

In an embodiment of the present disclosure, the podcast interaction system recommends one or more podcasts to the user. The podcast interaction system provides recommendation of the one or more podcasts based on the third set of data. The third of data is utilized for determining interest of the user.

In an embodiment of the present disclosure, the podcast interaction system enables a multi-modal natural language analysis on the podcast and the user verbal commands using a natural language processing module for dynamic transcription of the podcast and the user verbal commands in a transcript data. The transcript data includes a speech-based transcription and a non-speech-based transcription.

In an embodiment of the present disclosure, the podcast interaction system identifies a plurality of characteristics associated to the podcast and the user based on the analysis performed based on the one or more machine learning algorithms and the natural language processing module. The plurality of characteristics include one or more keywords, topic transitions within the podcast, halts in the podcast, context of the podcast, an optimal time for the one or more triggers, an optimal position for the one or more triggers, a threshold time of the halt within the podcast, a threshold complexity, interests of the user, user journey throughout the podcast, and the one or more queries associated to the podcast.

In an embodiment of the present disclosure, the system generated triggers facilitate triggering of the interaction between the user and the podcast. The system generated triggers includes at least one of a significant keyword within the podcast, the halt within the podcast above the threshold time, the topic transitions within the podcast, referring to topics of the interests of the user within the podcast according to the profile of the user, and intricateness of content of the podcast above the threshold complexity.

In an embodiment of the present disclosure, the user generated triggers facilitate triggering of the interaction between the user and the podcast by the user. The user generated triggers includes at least one of the user verbal commands, the user text, user facial expressions, user gestures, and hardware button commands associated with the communication device.

In an embodiment of the present disclosure, the podcaster generated triggers facilitate triggering of the interaction between the user and the podcast by the podcaster. The podcaster is person that is host or producer of the podcast. The podcaster generated triggers includes at least one of a podcaster defined time in the podcast, a podcaster defined topic in the podcast, a podcaster defined topic transition in the podcast, and podcaster commands to a podcaster interaction trigger button.

In an embodiment of the present disclosure, the podcast interaction system connects the user with the podcaster for the interaction. The user is connected with the podcaster based on availability of the podcaster. The podcast interaction system automatically responds to a query of the one or more queries of the user with an optimal response from a database of responses. The database of responses is created based on a plurality of responses to the user from the podcast interaction system or the podcaster based on past queries.

In a third example, a non-transitory computer-readable storage medium is provided. The non-transitory computer-readable storage medium encodes computer executable instructions that, when executed by at least one processor, performs a method enabling interaction between a user and a podcast. The method includes a first step to receive a first set of data associated with the podcast at the computing device. In addition, the method includes a second step to collect a second set of data associated with a communication device of the user at the computing device. Further, the method includes a third step to fetch a third set of data associated with the user accessing the podcast through the communication device in real time. Furthermore, the method includes a fourth step to analyze the first set of data, the second set of data and the third set of data using one or more machine learning algorithms at the computing device. Moreover, the method includes a fifth step to detect one or more triggers for enabling the interaction between the user and the podcast in real-time at the computing device. Also, the method includes a sixth step to initialize the interaction between the user and the podcast in real-time at the computing device. Also, the method includes a seventh step to interactively respond to one or more queries of the user. The first set of data is received from a podcaster. The podcast is uploaded by the podcaster. The user accesses the podcast using the communication device in real-time. The analysis is performed by a podcast interaction system based on training of a machine learning model. The analysis is performed for detecting one or more triggers. The analysis is performed in real time. The one or more triggers includes at least one of system generated triggers, user generated triggers and podcaster generated triggers. The interaction between the user and the podcast is initiated based on the detection of the one or more triggers for raising the one or more queries. The response to the one or more queries is provided to the user in one or more output formats.

BRIEF DESCRIPTION OF THE DRAWINGS

Figure 1:
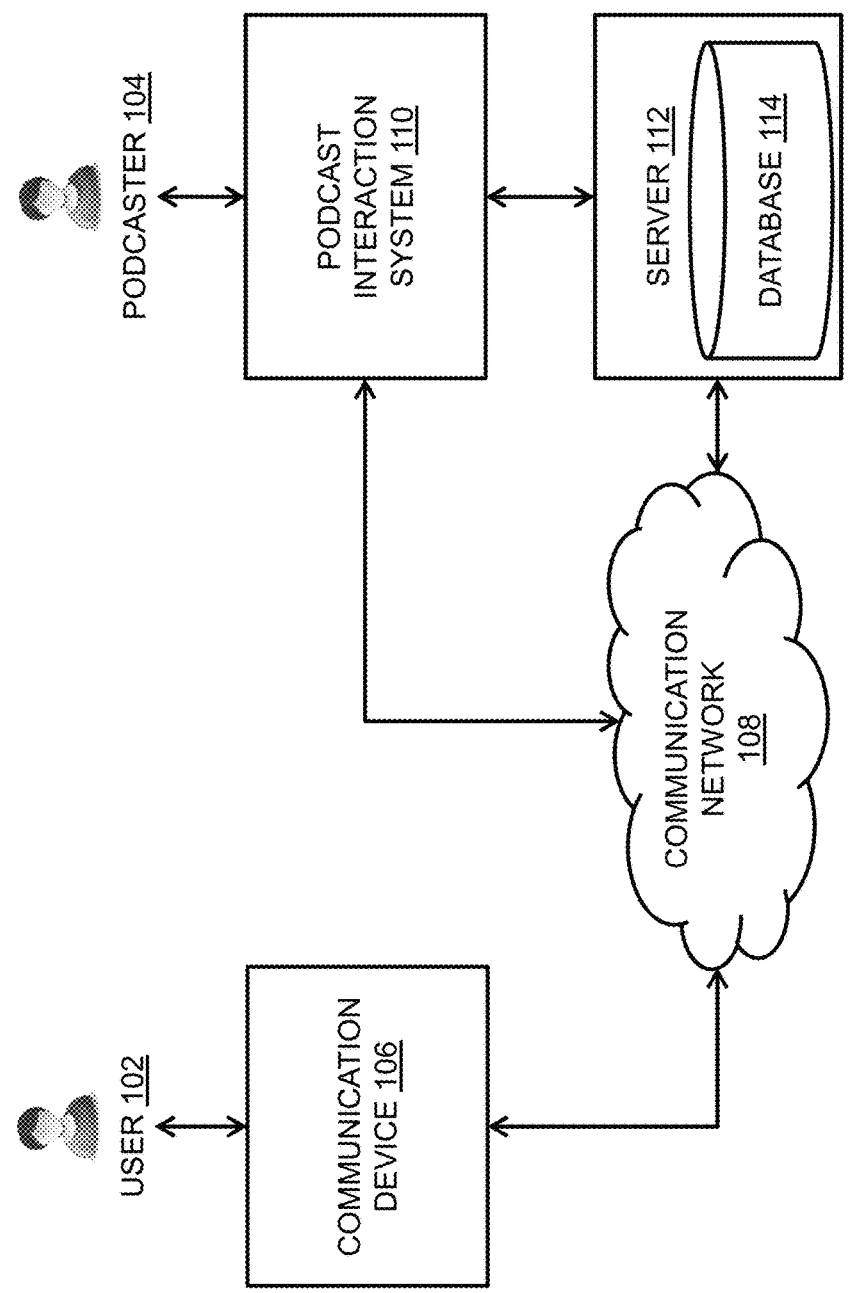
Figure 2A:
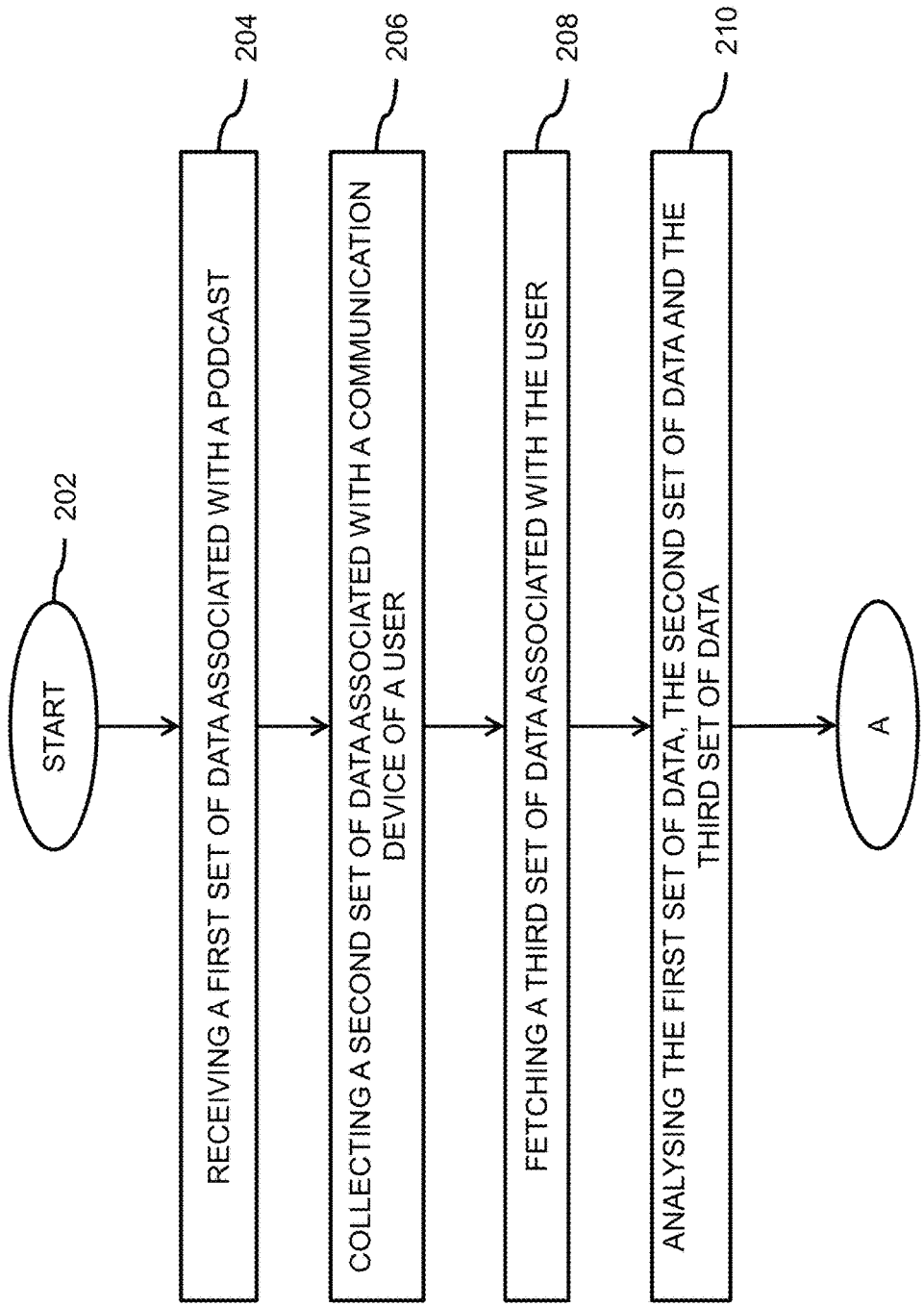
Figure 2B:
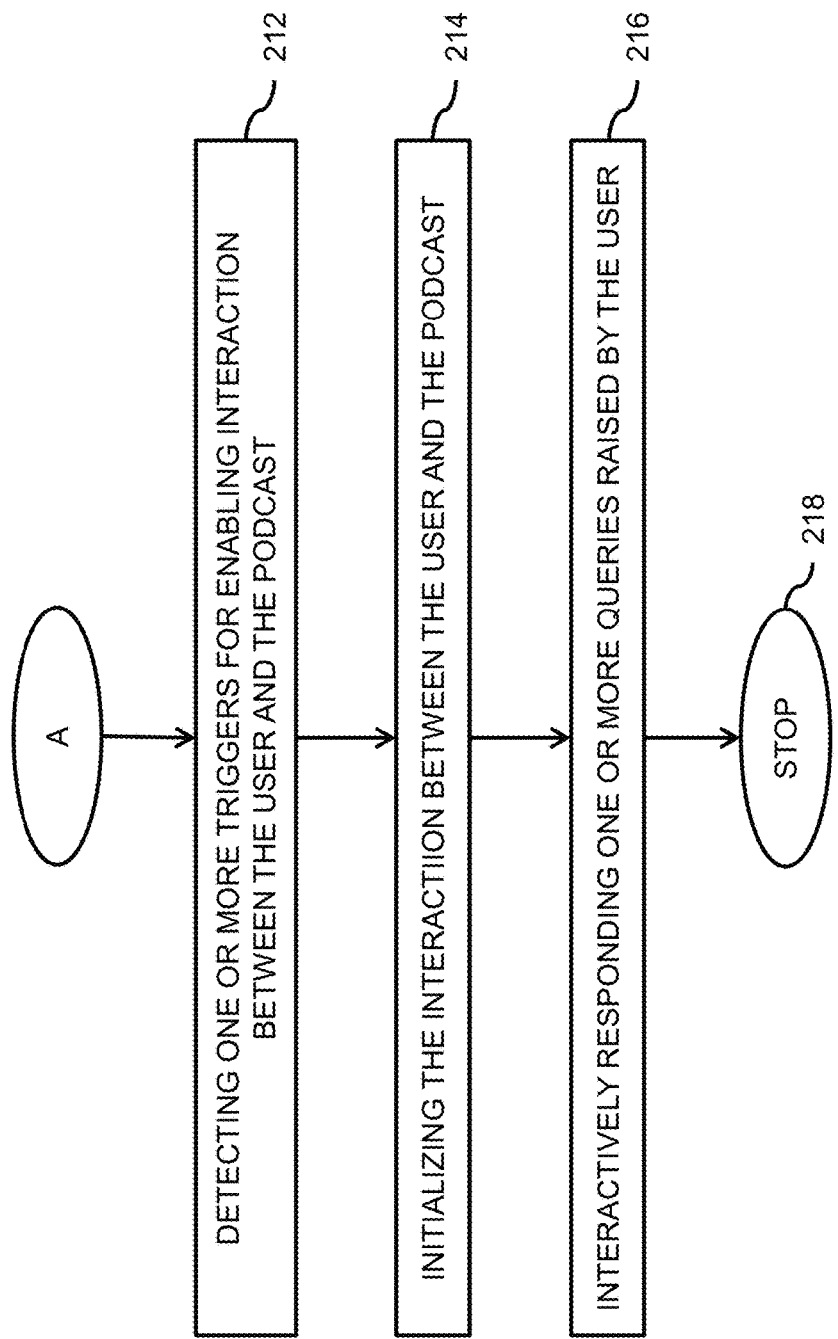
Figure 3:
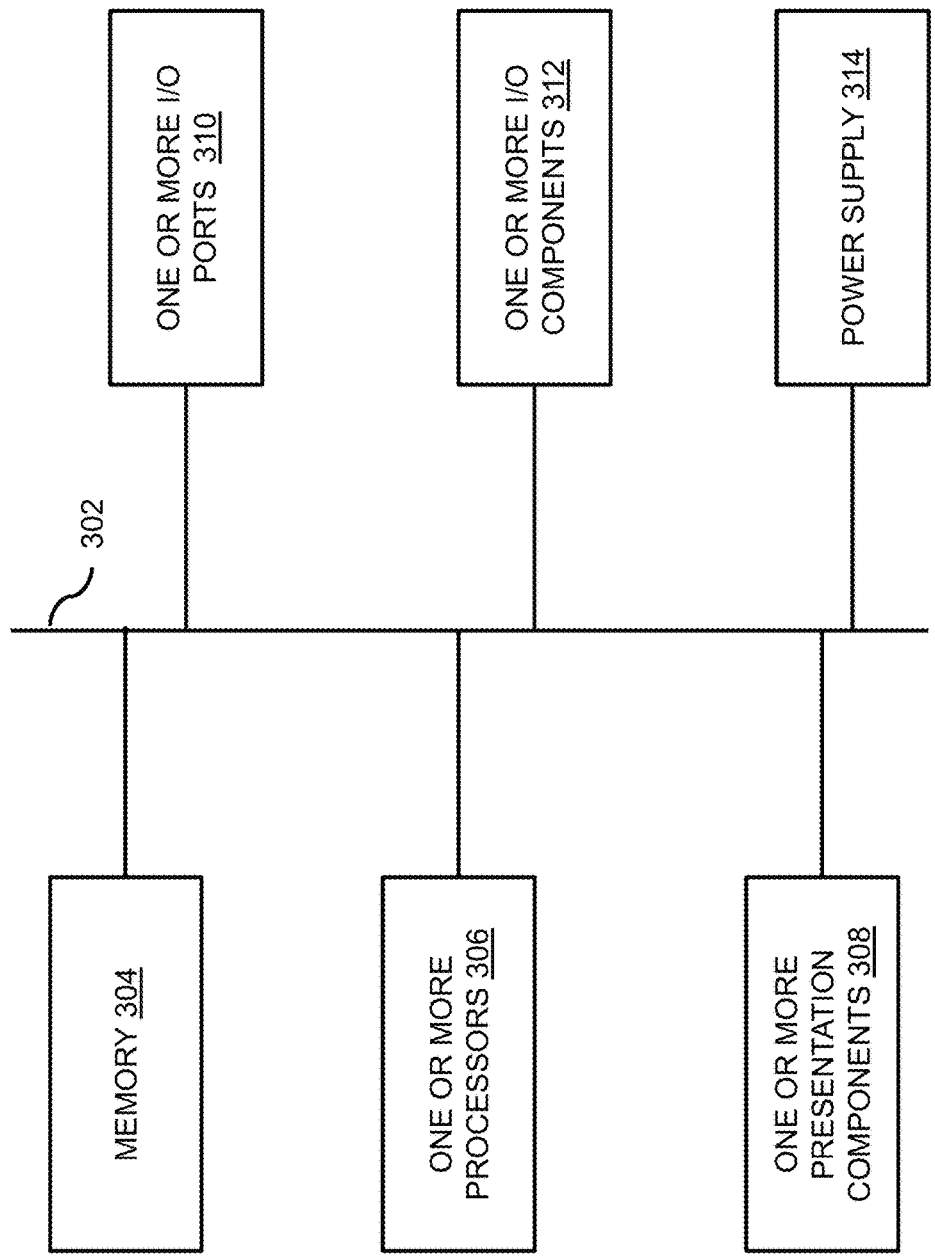

Having thus described the invention in general terms, reference will now be made to the accompanying drawings, wherein:

FIG. 1 illustrates an interactive computing environment for enabling an interaction between a user and a podcast, in accordance with various embodiments of the present disclosure;

FIGS. 2A and 2B illustrate a flow chart depicting a method for enabling the interaction between the user and the podcast, in accordance with various embodiments of the present disclosure; and FIG. 3 illustrates a block diagram of a computing device, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

FIG. 1 illustrates an interactive computing environment 100 for enabling an interaction between a user 102 and a podcast, in accordance with various embodiments of the present disclosure. The interactive computing environment 100 includes the user 102, a podcaster 104, a communication device 106, a communication network 108, and a podcast interaction system 110. In addition, the interactive computing environment 100 includes a server 112, and a database 114. The components of the interactive computing environment 100 work in conjunction with each other to enable the interaction between the user 102 and the podcast.

The interactive computing environment 100 includes the users 102. In an embodiment of the present disclosure, the user 102 is any person who accesses the podcast. In another embodiment of the present disclosure, the user 102 is any person who wants to interact with the podcast. In yet another embodiment of the present disclosure, the user 102 is any person who wants to download the podcast. The user 102 is any person or individual accessing the communication device 106. In an embodiment of the present disclosure, the user 102 is an owner of the communication device 106. In another embodiment of the present disclosure, the user 102 is not the owner of the communication device 106. In an embodiment of the present disclosure, the user 102 accesses the communication device 106 at home. In another embodiment of the present disclosure, the user 102 accesses the communication device 106 at a cafe. In yet another embodiment of the present disclosure, the user 102 accesses the communication device 104 in an office. In an example, a user U1 accesses a smartphone S1 while sitting in a living room. In another example, a user U2 accesses a laptop L1 while travelling from one place to another. In yet another example, a user U3 accesses a desktop computer D1 while working in the office. The user 102 accesses the podcast using the communication device 106 in real-time.

The communication device 106 is associated with the user 102. In an embodiment of the present disclosure, the communication device 106 is a portable communication device. The portable communication device includes but may not be limited to a laptop, a smartphone, a tablet, and a smart watch. In another embodiment of the present disclosure, the communication device 106 is a fixed communication device. The fixed communication device includes but may not be limited to a desktop computer, a smart television, a mainframe computer, and a workstation.

The communication device 106 includes a memory. In general, the memory includes computer-storage media in the form of volatile and/or nonvolatile memory. The memory may be removable, non-removable, or a combination thereof. Exemplary hardware devices include solid-state memory, hard drives, optical-disc drives, etc. The memory is coupled with one or more processors. In general, the one or more processors read data from various entities such as memory or I/O components. The one or more processors execute the one or more instructions which are stored in the memory. The one or more processors provide execution method for one or more instructions provided by the podcast interaction system 110.

In an embodiment of the present disclosure, the communication device 106 is currently in the switched-on state. In addition, the communication device 106 is any type of device having an active internet. In an embodiment of the present disclosure, the communication device 106 perform computing operations based on a suitable operating system installed inside the communication device 106. In general, the operating system is system software that manages computer hardware and software resources and provide common services for computer programs. In addition, the operating system acts as an interface for software installed inside the communication device 106 to interact with hardware components of the communication device 106. In an embodiment of the present disclosure, the communication device 106 performs computing operations based on any suitable operating system designed for the portable communication device. In an example, the operating system installed inside the communication devices 106 is a mobile operating system. Further, the mobile operating system includes but may not be limited to windows operating system, android operating system, iOS operating system, Symbian operating system, BADA operating system from Samsung Electronics and BlackBerry operating system, and sailfish. However, the operating system is not limited to above mentioned operating systems. In an embodiment of the present disclosure, the communication devices 106 operate on any version of particular operating system corresponding to above mentioned operating systems.

In another embodiment of the present disclosure, the communication device 106 perform computing operations based on any suitable operating system designed for fixed communication device. In an example, the operating system installed inside the communication device 106 is windows. In another example, the operating system installed inside the communication device 106 is Mac. In yet another example, the operating system installed inside the plurality of communication devices is Linux based operating system. In yet another example, the operating system installed inside the communication devices 106 is Chrome OS. In yet another example, the operating system installed inside the plurality of communication devices 106 is one of UNIX, Kali Linux, and the like. However, the operating system is not limited to above mentioned operating systems.

In an embodiment of the present disclosure, the communication device 106 operates on any version of windows operating system. In another embodiment of the present disclosure, the communication device 106 operates on any version of Mac operating system. In yet another embodiment of the present disclosure, the communication device 106 operates on any version of Linux operating system. In yet another embodiment of the present disclosure, the communication device 106 operates on any version of Chrome OS. In yet another embodiment of the present disclosure, the communication device 106 operates on any version of particular operating system corresponding to above mentioned operating systems.

The interactive computing environment 100 includes the podcaster 104. In an embodiment of the present disclosure, the podcaster 104 is person that is host or producer of the podcast. In another embodiment of the present disclosure, the podcaster 104 is an author of the podcast. In yet another embodiment of the present disclosure, the podcaster 104 is an uploader of the podcast. The podcaster 104 may be an individual, a group or a company to publish or upload the podcast on one or more podcast platforms by creating an account. The podcast is uploaded by the podcaster 104 on the one or more podcast platforms. In an embodiment of the present disclosure, the podcast corresponds to any of an enhanced podcast, a podcast audiobook, a video podcast. In an embodiment of the present disclosure, the podcast is one of a pre-recorded podcast and a live podcast. In an example, the podcast is a pre-recorded enhanced podcast. In another example, the podcast is a live enhanced podcast. In an example, the podcast is a pre-recorded video podcast. In another example, the podcast is a live video podcast.

In an embodiment of the present disclosure, the one or more podcast platforms are installed on the communication device 106. The one or more podcast platforms allow the user 102 to access the podcast. In another embodiment of the present disclosure, the one or more podcast platforms are run on a plurality of web browsers installed on the communication device 106 of the user 102. In an example, the plurality of web browsers include but may not be limited to Opera, Mozilla Firefox, Google Chrome, Internet Explorer, Microsoft Edge, Safari and UC Browser. Further, the plurality of web browsers installed on the communication device 106 runs on any version of the respective web browser of the above mentioned web browsers. In an embodiment of the present disclosure, the user 102 installs the one or more podcast platforms on the communication device 106. In another embodiment of the present disclosure, the user 102 accesses the one or more podcast platforms on the plurality of web browsers installed on the communication device 106.

In an embodiment of the present disclosure, the one or more podcast platforms correspond to android operating system compatible applications. In another embodiment of the present disclosure, the one or more podcast platforms correspond to windows operating system compatible applications. In yet another embodiment of the present disclosure, the one or more podcast platforms correspond to mac operating system compatible applications. In yet another embodiment of the present disclosure, the one or more podcast platforms correspond to webpages. However, the one or more podcast platforms are not limited to the above-mentioned online platforms.

The communication device 106 enables the user 102 to perform a plurality of activities on the one or more podcast platforms. The communication device 106 supports various multimedia contents. The user 102 performs the plurality of activities in real-time with facilitation of the communication device 106. The plurality of activities include but may not be limited to searching the podcast, listening the podcast, watching the podcast, posting one or more queries related to the podcast, and interacting with the podcaster 104.

The interactive computing environment 100 includes the podcast interaction system 110. The podcast interaction system 110 is associated with the podcaster 104. The podcast interaction system 110 receives a first set of data from the podcaster 104. The first set of data is associated with the podcast. The first set of data includes but may not be limited to audio data, video data, image data, subject matter of the podcast, theme of the podcast, keywords associated with the podcast, podcaster profile, and topics covered in the podcast. In addition, the podcaster interaction system 110 is associated with the communication device 106 of the user 102. The podcaster interaction system is associated with the communication device 106 with facilitation of the communication network 108. In an embodiment of the present disclosure, the communication network 108 is a cable television network such as a co-axial cable or hybrid fiber co-ax network. In another embodiment of the present disclosure, the communication network 108 includes satellite network, a data network (local area network, metropolitan area network and wide area network), distributed networks (Internet) and the like. The communication network 108 connects the communication device 106 to the podcast interaction system 110 using a plurality of methods. The plurality of methods used to provide network connectivity to the communication device 104 includes 2G, 3G, 4G, 5G, Wifi and the like.

The podcast interaction system 110 collects a second set of data from the communication device 106 through the communication network 108. The second set of data is associated with the communication device 106 of the user 102. The second set of data includes real-time location of the communication device 106, location history of the communication device 106, sound data from a microphone of the communication device 106, and image data from a camera of the communication device 106. In addition, the second set of data includes accelerometer data from an accelerometer of the communication device 106, gyroscope data from a gyroscope of the communication device 106, real-time movement data, sensor data from a sensor of the communication device 106 and the like.

The podcast interaction system 110 fetches a third set of data through the communication device 106 of the user 102. The third set of data is associated with the user 102 accessing the podcast through the communication device 106 in real-time. In an embodiment of the present disclosure, the third set of data associated with a profile of the user 102. The third set of data includes but may not be limited to name data, age data, e-mail identity data, contact number data, gender data, geographic location data, demographic data, and relationship status data. In addition, the third set of data includes past podcast search keywords data, real-time podcast search keywords data, past podcast reviews data, and past podcast interactions data. Further, the third set of data includes user verbal commands, user text, user image data, communication device operated commands, past gestures data, real-time gestures data and the like. The podcast interaction system 110 updates the profile of the user 102. In an embodiment of the present disclosure, the profile of the user 102 is updated based on change in the third set of data. In an example, the profile of the user 102 is updated based on real-time activities of the user 102. Further, the real-time activities of the user 102 include but may not be limited to real-time podcast searches, real-time liked podcast, real-time feedback on the podcast, and real-time queries.

The podcast interaction system 110 analyses the first set of data, the second set of data and the third set of data using one or more machine learning algorithms. The podcast interaction system 110 performs the analysis of the first set of data, the second set of data and the third set of data based on training of a machine learning model. The analysis of the first set of data, the second set of data and the third set of data is performed in real time to detect one or more triggers. The podcast interaction system 110 detects the one or more triggers to enable the interaction between the user 102 and the podcast in real-time. The one or more triggers includes at least one of system generated triggers, user generated triggers and podcaster generated triggers.

The system generated triggers facilitate triggering of the interaction between the user 102 and the podcast. The system generated triggers includes at least one of a significant keyword within the podcast, the halt within the podcast above the threshold time, the topic transitions within the podcast, referring to topics of the interests of the user within the podcast according to the profile of the user, and intricateness of content of the podcast above the threshold complexity. In addition, the user generated triggers facilitate triggering of the interaction between the user 102 and the podcast by the user 102. The user generated triggers includes at least one of the user verbal commands, the user text, user facial expressions, user gestures, and hardware button commands associated with the communication device 106. The user verbal commands, the user text, user facial expressions, user gestures, and hardware button commands may be defined by any of the user 102. In addition, the user verbal commands, the user text, user facial expressions, user gestures, and hardware button commands may be customized by the user 102. Further, the user gestures include but may not be limited to thumbs up, wrist roll, eye-blink, clapping, waving hands, foot movement, neck movement, wagging finger, head movement, and finger touch. Furthermore, the hardware button commands associated with the communication device 106 include but may not be limited to phone tapping, phone twist, biometric, phone shaking, phone movements, pressing volume buttons, and pressing power button of the communication device 106.

Further, the podcaster generated triggers facilitate triggering of the interaction between the user 102 and the podcast by the podcaster 104. The podcaster generated triggers includes at least one of a podcaster defined time in the podcast, a podcaster defined topic in the podcast, a podcaster defined topic transition in the podcast, and podcaster commands to a podcaster interaction trigger button. In an example, the podcaster 104 may initiate the interaction with the user 102 anytime with facilitation of the podcaster interaction trigger button.

The podcast interaction system 110 initializes the interaction between the user 102 and the podcast in real-time. The interaction between the user 102 and the podcast is initiated based on the detection of the one or more triggers to raise the one or more queries. The one or more queries are related to the podcast. The one or more queries are raised by the user 102. The podcast interaction system 110 interactively responds to the one or more queries of the user 102. The response to the one or more queries is provided to the user 102 in one or more output formats. The one or more output formats includes at least one of voice, gestures, and text. In addition, the one or more output formats includes but may not be limited to images, videos, and animations.

In an embodiment of the present disclosure, the podcast interaction system 110 sends alerts to the podcaster 104 when the user 102 raises one or more queries related to the podcast. The podcast interaction system 110 sends alerts to the podcaster 104 to initiate the interaction between the user 102 and the podcaster 104. In addition, the podcast interaction system 110 sends alerts to the user 102 when the podcaster 104 responds to the one or more queries of the user 102.

The podcast interaction system 110 recommends one or more podcasts to the user 102. The podcast interaction system 110 provides recommendation of the one or more podcasts based on the third set of data. The third of data is utilized to determine interest of the user 102 to recommend the one or more podcasts to the user 102. The podcast interaction system 110 enables a multi-modal natural language analysis on the podcast and the user verbal commands. The podcast interaction system 110 enables the multi-modal natural language analysis using a natural language processing module. The natural language processing module is utilized for dynamic transcription of the podcast and the user verbal commands in a transcript data. The transcript data includes but may not be limited to a speech-based transcription and a non-speech-based transcription.

The podcast interaction system 110 identifies a plurality of characteristics associated to the podcast and the user. The plurality of characteristics are identified based on the analysis performed based on the one or more machine learning algorithms and the natural language processing module. The plurality of characteristics includes one or more keywords, topic transitions within the podcast, halts in the podcast, context of the podcast, and an optimal time for the one or more triggers. In addition, the plurality of characteristics includes an optimal position for the one or more triggers, a threshold time of the halt within the podcast, a threshold complexity, interests of the user, user journey throughout the podcast, and the one or more queries associated to the podcast.

The podcast interaction system 110 connects the user 102 with the podcaster 104 for the interaction. The user 102 is connected with the podcaster 104 based on availability of the podcaster 104. The user 102 raises the one or more queries for the podcaster 104 based on availability of the podcaster 104. The podcast interaction system 110 automatically responds to a query of the one or more queries of the user 102 with an optimal response from a database of responses. The database of responses is created based on a plurality of responses provided to the user from the podcast interaction system 110 or the podcaster based on past queries.

The podcast interaction system 110 is associated with the server 112. The server 112 stores one or more instructions to perform various operations of the podcast interaction system 112. In an embodiment of the present disclosure, the server 112 is a cloud server which is built, hosted and delivered through a cloud computing platform. In general, cloud computing is a process of using remote network server which are hosted on the internet to store, manage, and process data. The use of cloud server helps the podcast interaction system 112 to receive the first set of data, the second set of data and the third set of data.

In addition, the server 112 is associated with the database 114. The database 114 is storage location of all the data associated with the podcast interaction system 114. In an embodiment of the present disclosure, the podcast interaction system 114 stores the first set of data, the second set of data and the third set of data. In general, the database 114 is used to hold general information and specialized data associated with the user 102, the podcaster 104, and the communication device 106. The database 114 organizes the data using models such as relational models or hierarchical models. Further, the database 114 store data provided by the administrator.

FIGS. 2A and 2B illustrate a flow chart 200 depicting a method for enabling the interaction between the user and the podcast, in accordance with various embodiments of the present disclosure. The method initiates at step 202. Following step 202, at step 204, the podcast interaction system 110 receives a first set of data associated with the podcast. The first set of data is received from a podcaster. At step 206, the podcast interaction system 110 collects the second set of data associated with the communication device 106 of the user 102. At step 208, the podcast interaction system 110 fetches the third set of data associated with the user 102. At step 210, the podcast interaction system 110 analyses the first set of data, the second set of data and the third set of data. The podcast interaction system 110 analyses the first set of data, the second set of data and the third set of data using one or more machine learning algorithms. At step 212, the podcast interaction system 110 detecting one or more triggers to enable interaction between the user 102 and the podcast. At step 214, the podcast interaction system 110 initializes the interaction between the user 102 and the podcast. At step 216, the podcast interaction system 110 interactively responds to the one or more queries raised by the user 102. The method terminates at step 218.

FIG. 3 illustrates a block diagram of a computing device 300, in accordance with various embodiments of the present disclosure. The computing device 300 includes a bus 302 that directly or indirectly couples the following devices: memory 304, one or more processors 306, one or more presentation components 308, one or more input/output (I/O) ports 310, one or more input/output components 312, and an illustrative power supply 314. The bus 302 represents what may be one or more busses (such as an address bus, data bus, or combination thereof). Although the various blocks of FIG. 3 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 3 is merely illustrative of an exemplary computing device 300 that can be used in connection with one or more embodiments of the present invention. Distinction is not made between such categories as "workstation," "server,"

"laptop," "hand-held device," etc., as all are contemplated within the scope of FIG. 3 and reference to "computing device."

The computing device 300 typically includes a variety of computer-readable media. The computer-readable media can be any available media that can be accessed by the computing device 300 and includes both volatile and non-volatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data.

The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 300. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 304 includes computer-storage media in the form of volatile and/or nonvolatile memory. The memory 304 may be removable, non-removable, or a combination thereof. Exemplary hardware devices include solid-state memory, hard drives, optical-disc drives, etc. The computing device 300 includes one or more processors that read data from various entities such as memory 304 or I/O components 312. The one or more presentation components 308 present data indications to a user or other device. Exemplary presentation components include a display device, speaker, printing component, vibrating component, etc. The one or more I/O ports 310 allow the computing device 300 to be logically coupled to other devices including the one or more I/O components 312, some of which may be built in. Illustrative components include a microphone, joystick, game pad, satellite dish, scanner, printer, wireless device, etc.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed is:

1. A computer-implemented method for enabling an interaction between a user and a podcast, the computer-implemented method comprising:

receiving, at a podcast interaction system with a processor, a first set of data associated with the podcast, wherein the first set of data is received from a podcaster, wherein the podcast is uploaded by the podcaster;

collecting, at the podcast interaction system with the processor, a second set of data associated with a communication device of the user, wherein the user accesses the podcast using the communication device in real-time;

fetching, at the podcast interaction system with the processor, a third set of data associated the user accessing the podcast through the communication device in real-time, wherein the third set of data is associated with a profile of the user, wherein the third set of data comprising name data, age data, e-mail identity data, contact number data, gender data, geographic location data, demographic data, relationship status data, past podcast search keywords data, real-time podcast search keywords data, past podcast reviews data, past podcast interactions data, user verbal commands, user text, user image data, communication device operated commands, past gestures data, and real-time gestures data;

analyzing, at the podcast interaction system with the processor, the first set of data, the second set of data and the third set of data using one or more machine learning algorithms, wherein the analysis is performed based on training of a machine learning model, wherein the analysis is performed for detecting one or more triggers, wherein the analysis is performed in real time;

detecting, at the podcast interaction system with the processor, the one or more triggers for enabling the interaction between the user and the podcast in real-time, wherein the one or more triggers is chosen from the group consisting of system generated triggers, user generated triggers and podcaster generated triggers;

initializing, at the podcast interaction system with the processor, the interaction between the user and the podcast in real-time, wherein the interaction between the user and the podcast is initiated based on the detection of the one or more triggers for raising one or more queries;

interactively responding, at the podcast interaction system with the processor, to the one or more queries of the user, wherein the response to the one or more queries is provided to the user in one or more output formats; and recommending, at the podcast interaction system, one or more podcasts to the user, wherein the podcast interaction system provides recommendation of the one or more podcasts based on the third set of data, wherein the third of data is utilized for determining interest of the user.

2. The computer-implemented method as recited in claim 1, wherein the first set of data comprising audio data, video data, image data, subject matter of the podcast, theme of the podcast, keywords associated with the podcast, podcaster profile, and topics covered in the podcast, wherein the podcast corresponds to any of an enhanced podcast, a podcast audiobook, a video podcast, and a live podcast.

3. The computer-implemented method as recited in claim 1, wherein the second set of data comprising real-time location of the communication device, location history of the communication device, sound data from a microphone of the communication device, image data from a camera of the communication device, accelerometer data from an accelerometer of the communication device, gyroscope data from a gyroscope of the communication device, real-time movement data, and sensor data from a sensor of the communication device.

4. The computer-implemented method as recited in claim 1, further comprising enabling, at the podcast interaction system with the processor, a multi-modal natural language analysis on the podcast and the user verbal commands using a natural language processing module for dynamic transcription of the podcast and the user verbal commands in a transcript data, wherein the transcript data comprising a speech-based transcription and a non-speech-based transcription.

5. The computer-implemented method as recited in claim 1, further comprising identifying, at the podcast interaction system with the processor, a plurality of characteristics associated to the podcast and the user based on the analysis performed based on the one or more machine learning algorithms and the natural language processing module, wherein the plurality of characteristics comprising one or more keywords, topic transitions within the podcast, halts in the podcast, context of the podcast, an optimal time for the one or more triggers, an optimal position for the one or more triggers, a threshold time of the halt within the podcast, a threshold complexity, interests of the user, user journey throughout the podcast, and the one or more queries associated to the podcast.

6. The computer-implemented method as recited in claim 1, wherein the system generated triggers facilitate triggering of the interaction between the user and the podcast, wherein the system generated triggers comprising at least one of a significant keyword within the podcast, the halt within the podcast above the threshold time, the topic transitions within the podcast, referring to topics of the interests of the user within the podcast according to the profile of the user, and intricateness of content of the podcast above the threshold complexity.

7. The computer-implemented method as recited in claim 1, wherein the user generated triggers facilitate triggering of the interaction between the user and the podcast by the user, wherein the user generated triggers comprising at least one of the user verbal commands, the user text, user facial expressions, user gestures, and hardware button commands associated with the communication device.

8. The computer-implemented method as recited in claim 1, wherein the podcaster generated triggers facilitate triggering of the interaction between the user and the podcast by the podcaster, wherein the podcaster is person that is host or producer of the podcast, wherein the podcaster generated triggers comprising at least one of a podcaster defined time in the podcast, a podcaster defined topic in the podcast, a podcaster defined topic transition in the podcast, and podcaster commands to a podcaster interaction trigger button.

9. The computer-implemented method as recited in claim 1, further comprising connecting, at the podcast interaction system with the processor, the user with the podcaster for the interaction, wherein the user is connected with the podcaster based on availability of the podcaster, wherein the podcast interaction system automatically responds to a query of the one or more queries of the user with an optimal response from a database of responses, wherein the database of responses is created based on a plurality of responses to the user from the podcast interaction system or the podcaster based on past queries.

10. A computer system comprising:
one or more processors;
a signal circuitry embedded inside a computing device for generating a signal; and
a memory coupled to the one or more processors, the memory for storing instructions which, when executed by the one or more processors, cause the one or more processors to perform a method for enabling an interaction between a user and a podcast using a podcast interaction system, the method comprising:
receiving, at the podcast interaction system, a first set of data associated with the podcast, wherein the first set of data is received from a podcaster, wherein the podcast is uploaded by the podcaster;
collecting, at the podcast interaction system, a second set of data associated with a communication device of the user, wherein the user accesses the podcast using the communication device in real-time;
fetching, at the podcast interaction system, a third set of data associated the user accessing the podcast through the communication device in real-time, wherein the third set of data is associated with a profile of the user, wherein the third set of data comprising name data, age data, e-mail identity data, contact number data, gender data, geographic location data, demographic data, relationship status data, past podcast search keywords data, real-time podcast search keywords data, past podcast reviews data, past podcast interactions data, user verbal commands, user text, user image data, communication device operated commands, past gestures data, and real-time gestures data;
analyzing, at the podcast interaction system, the first set of data, the second set of data and the third set of data using one or more machine learning algorithms, wherein the analysis is performed based on training of a machine learning model, wherein the analysis is performed for detecting one or more triggers, wherein the analysis is performed in real time;
detecting, at the podcast interaction system, the one or more triggers for enabling the interaction between the user and the podcast in real-time, wherein the one or more triggers is chosen from the group consisting of system generated triggers, user generated triggers and podcaster generated triggers;
initializing, at the podcast interaction system, the interaction between the user and the podcast in real-time, wherein the interaction between the user and the podcast is initiated based on the detection of the one or more triggers for raising one or more queries;
interactively responding, at the podcast interaction system, to the one or more queries of the user, wherein the response to the one or more queries is provided to the user in one or more output formats; and
recommending, at the podcast interaction system, one or more podcasts to the user, wherein the podcast interaction system provides recommendation of the one or more podcasts based on the third set of data, wherein the third of data is utilized for determining interest of the user.

11. The computer system as recited in claim 10, wherein the first set of data comprising audio data, video data, image data, subject matter of the podcast, theme of the podcast, keywords associated with the podcast, podcaster profile, and topics covered in the podcast, wherein the podcast corresponds to any of an enhanced podcast, a podcast audiobook, a video podcast, and a live podcast.

12. The computer system as recited in claim 10, wherein the second set of data comprising real-time location of the communication device, location history of the communication device, sound data from a microphone of the communication device, image data from a camera of the communication device, accelerometer data from an accelerometer of the communication device, gyroscope data from a gyroscope of the communication device, real-time movement data, and sensor data from a sensor of the communication device.

13. The computer system as recited in claim 10, wherein the podcast interaction system enables a multi-modal natural language analysis on the podcast and the user verbal commands using a natural language processing module for dynamic transcription of the podcast and the user verbal commands in a transcript data, wherein the transcript data comprising a speech-based transcription and a non-speech-based transcription.

14. The computer system as recited in claim 10, wherein the podcast interaction system identifies a plurality of characteristics associated to the podcast and the user based on the analysis performed based on the one or more machine learning algorithms and the natural language processing module, wherein the plurality of characteristics comprising one or more keywords, topic transitions within the podcast, halts in the podcast, context of the podcast, an optimal time for the one or more triggers, an optimal position for the one or more triggers, a threshold time of the halt within the podcast, a threshold complexity, interests of the user, user journey throughout the podcast, and the one or more queries associated to the podcast.

15. The computer system as recited in claim 10, wherein the system generated triggers facilitate triggering of the interaction between the user and the podcast, wherein the system generated triggers comprising at least one of a significant keyword within the podcast, the halt within the podcast above the threshold time, the topic transitions within the podcast, referring to topics of the interests of the user within the podcast according to the profile of the user, and intricateness of content of the podcast above the threshold complexity.

16. A non-transitory computer-readable storage medium encoding computer executable instructions that, when executed by at least one processor, performs a method for enabling interaction between a user and a podcast using a podcast interaction system, the method comprising:

receiving, at a computing device, a first set of data associated with the podcast, wherein the first set of data is received from a podcaster, wherein the podcast is uploaded by the podcaster;

collecting, at the computing device, a second set of data associated with a communication device of the user, wherein the user accesses the podcast using the communication device in real-time;

fetching, at the computing device, a third set of data associated the user accessing the podcast through the communication device in real-time, wherein the third set of data is associated with a profile of the user, wherein the third set of data comprising name data, age data, e-mail identity data, contact number data, gender data, geographic location data, demographic data, relationship status data, past podcast search keywords data, real-time podcast search keywords data, past podcast reviews data, past podcast interactions data, user verbal commands, user text, user image data, communication device operated commands, past gestures data, and real-time gestures data;

analyzing, at the computing device, the first set of data, the second set of data and the third set of data using one or more machine learning algorithms, wherein the analysis is performed based on training of a machine learning model, wherein the analysis is performed for detecting one or more triggers, wherein the analysis is performed in real time;

detecting, at the computing device, the one or more triggers for enabling the interaction between the user and the podcast in real-time, wherein the one or more triggers chosen from the group consisting of system generated triggers, user generated triggers and podcaster generated triggers;

initializing, at the computing device, the interaction between the user and the podcast in real-time, wherein the interaction between the user and the podcast is initiated based on the detection of the one or more triggers for raising one or more queries;

interactively responding, at the computing device, to the one or more queries of the user, wherein the response to the one or more queries is provided to the user in one or more output formats; and recommending, at the podcast interaction system, one or more podcasts to the user, wherein the podcast interaction system provides recommendation of the one or more podcasts based on the third set of data, wherein the third of data is utilized for determining interest of the user.

\* \* \* \* \*